(12) United States Patent
Frampton et al.

(10) Patent No.: US 10,649,420 B2
(45) Date of Patent: May 12, 2020

(54) GENERATOR MANAGEMENT SYSTEM AND METHOD THAT SELECTIVELY ACTIVATE AT LEAST ONE OF A PLURALITY OF GENERATORS IN A POWER GENERATION SYSTEM

(71) Applicant: Kohler Co., Kohler, WI (US)

(72) Inventors: Isaac S. Frampton, Strattanville, PA (US); Frank C. Formas, Kohler, WI (US); Joseph Petrus Eduardus Raats, Zevenbergen (NL)

(73) Assignee: Kohler Co., Kohler, WI (US)

( * ) Notice: Subject to any disclaimer, the term of this patent is extended or adjusted under 35 U.S.C. 154(b) by 21 days.

(21) Appl. No.: 15/648,614

(22) Filed: Jul. 13, 2017

(65) Prior Publication Data

US 2017/0322528 A1  Nov. 9, 2017

Related U.S. Application Data

(63) Continuation of application No. 14/251,057, filed on Apr. 11, 2014, now Pat. No. 9,778,632, which is a
(Continued)

(51) Int. Cl.
*G05B 15/02* (2006.01)
*H02P 9/02* (2006.01)
*H02J 3/38* (2006.01)

(52) U.S. Cl.
CPC ............. *G05B 15/02* (2013.01); *H02J 3/38* (2013.01); *H02P 9/02* (2013.01)

(58) Field of Classification Search
None
See application file for complete search history.

(56) References Cited

U.S. PATENT DOCUMENTS 2,546,410 A   3/1951  Schwendner et al.
2,832,896 A   4/1958  Stineman et al.
(Continued)

FOREIGN PATENT DOCUMENTS

CN   201378280 Y   1/2010
CN   201378821 Y   1/2010
(Continued)

OTHER PUBLICATIONS

India Examination Report for India Patent Application No. 2167/MUM/2013 dated May 30, 2018.
(Continued)

*Primary Examiner* — Jared Fureman
*Assistant Examiner* — Joel Barnett
(74) *Attorney, Agent, or Firm* — Lempia Summerfield Katz LLC (57) ABSTRACT

A method of determining an operation of at least one of a plurality of generators in a power generation system. The method includes identifying a system parameter that is related to operation of the power generation system; and determining which of the plurality of generators to operate to minimize fuel consumption of the power generation system based on the system parameter. Other methods include identifying a system parameter that is related to operation of the power generation system; and determining which of the plurality of generators to operate by optimizing an operating variable of the power generation system based on the system parameter.

20 Claims, 10 Drawing Sheets

Related U.S. Application Data continuation-in-part of application No. 13/540,133, filed on Jul. 2, 2012, now Pat. No. 9,431,942.

(56) References Cited

U.S. PATENT DOCUMENTS

| | | | |
|---|---|---|---|
| 3,300,647 A | 1/1967 | Gogia et al. | |
| 3,489,914 A | 1/1970 | Taylor | |
| 4,233,555 A | 11/1980 | Roche | |
| 4,302,683 A | 11/1981 | Burton | |
| 4,405,892 A | 9/1983 | Staerzl | |
| 4,469,071 A | 9/1984 | Bassi et al. | |
| 4,625,123 A | 11/1986 | Gillett et al. | |
| 4,899,706 A | 2/1990 | Sasaki | |
| 5,252,905 A | 10/1993 | Wills et al. | |
| 5,256,959 A | 10/1993 | Nagano et al. | |
| 5,625,276 A | 4/1997 | Scott et al. | |
| 5,635,768 A | 6/1997 | Birch et al. | |
| 5,694,027 A | 12/1997 | Satake et al. | |
| 5,703,410 A | 12/1997 | Maekawa | |
| 5,730,098 A | 3/1998 | Sasaki et al. | |
| 5,886,890 A | 3/1999 | Ishida et al. | |
| 5,949,153 A | 9/1999 | Tison et al. | |
| 6,191,500 B1 | 2/2001 | Toy | |
| 6,631,310 B1 | 10/2003 | Leslie | |
| 6,844,706 B2 | 1/2005 | Pinkerton, III et al. | |
| 6,894,403 B2 | 5/2005 | Shinogi | |
| 6,923,168 B2 | 8/2005 | Bryde | |
| 8,049,348 B2 | 11/2011 | Czajkowski | |
| 8,294,431 B2 | 10/2012 | McLean et al. | |
| 8,766,479 B2 | 7/2014 | Dorn et al. | |
| 9,368,972 B2 | 6/2016 | Frampton | |
| 9,431,942 B2 | 8/2016 | Frampton et al. | |
| 2002/0089234 A1 | 7/2002 | Gilbreth et al. | |
| 2002/0134083 A1* | 9/2002 | Staphanos | G05B 23/0208 60/698 |
| 2005/0116814 A1 | 6/2005 | Rodgers et al. | |
| 2005/0184589 A1 | 8/2005 | Fujita | |
| 2006/0244327 A1 | 11/2006 | Kundel | |
| 2007/0262661 A1 | 11/2007 | Ai | |
| 2008/0296976 A1* | 12/2008 | Wright | H02J 3/008 307/76 |
| 2009/0012653 A1 | 1/2009 | Cheng et al. | |
| 2009/0108678 A1 | 4/2009 | Algrain | |
| 2009/0156068 A1 | 6/2009 | Barrett et al. | |
| 2009/0164806 A1 | 6/2009 | Dishman et al. | |
| 2010/0094490 A1 | 4/2010 | Alston et al. | |
| 2010/0102637 A1 | 4/2010 | Dozier et al. | |
| 2010/0148588 A1 | 6/2010 | Algrain | |
| 2010/0156191 A1 | 6/2010 | Dozier et al. | |
| 2010/0167601 A1 | 7/2010 | Rzadki et al. | |
| 2010/0207454 A1 | 8/2010 | Jagota et al. | |
| 2010/0274407 A1* | 10/2010 | Creed | H02J 3/14 700/295 |
| 2011/0042964 A1* | 2/2011 | Kitch | F02D 29/06 290/1 B |
| 2011/0130917 A1 | 6/2011 | Genssle et al. | |
| 2011/0149624 A1 | 6/2011 | Yamanaka | |
| 2011/0291411 A1 | 12/2011 | Folken | |
| 2011/0320053 A1* | 12/2011 | Dozier | H02J 3/38 700/287 |
| 2012/0007431 A1 | 1/2012 | Jang et al. | |
| 2012/0010757 A1 | 1/2012 | Francino et al. | |
| 2012/0049638 A1 | 3/2012 | Dorn et al. | |
| 2012/0242451 A1 | 9/2012 | Tanaka et al. | |
| 2014/0001868 A1 | 1/2014 | Frampton et al. | |
| 2014/0001873 A1 | 1/2014 | Tian et al. | |
| 2014/0028102 A1 | 1/2014 | Frampton | |
| 2014/0309797 A1 | 10/2014 | Frampton et al. | |
| 2016/0266595 A1 | 9/2016 | Creed | |

FOREIGN PATENT DOCUMENTS

| | | |
|---|---|---|
| CN | 102474450 A | 5/2012 |
| CN | 202331568 U | 7/2012 |
| CN | 103016171 A | 4/2013 |
| CN | 203275606 U | 11/2013 |
| CN | 103529716 A | 1/2014 |
| CN | 103684162 A | 3/2014 |
| DE | 102005062583 A1 | 7/2007 |
| EP | 1006641 A2 | 6/2000 |
| EP | 2683078 A2 | 1/2014 |
| EP | 2690738 A3 | 3/2014 |
| WO | WO2008130968 A1 | 10/2008 |
| WO | WO2012030947 A1 | 3/2012 |

OTHER PUBLICATIONS

Chinese Office Action for Chinese Patent Application No. 201510174041.7 dated Apr. 6, 2017, with English translation.
Chinese Office Action for Chinese Patent Application No. 201378280 dated Jan. 6, 2010, with English Translation.
Chinese Office Action for Chinese Patent Application No. 201378821 dated Jan. 6, 2010, with English Translation.
Chinese Application No. 201310268144.2, First OA dated Jul. 3, 2015, 9 pages.
Chinese Application No. 201310311755.9, First OA dated Aug. 21, 2015, 11 pages.
Chinese Application Serial No. 201310271829.0, Office Action dated Feb. 27, 2015, with English Translation, 19 pages.
Chinese Application Serial No. 201310311755.9, Office Action dated Aug. 21, 2015, 11 pages.
European Application No. 13003380.6, European Search Report dated Feb. 17, 2014, 9 pgs.
European Application No. 13003380.6, Response filed Sep. 17, 2014 to European Search Report dated Feb. 17, 2014, 18 pages.
European Application Serial No. 15191730.9, European Search Report dated Feb. 11, 2016, 9 pgs.
European Office Action for European Patent Application No. 13003262.6-1201 / 2683078, dated Feb. 23, 2018.
European Office Action for European Patent Application No. 13 003 262.6-1201 dated Aug. 27, 2019.

* cited by examiner

| LOAD | GEN 1 | GEN 2 | GEN 1, GEN 2 | GEN 3 | GEN 1, GEN 2 | GEN 2, GEN 3 | GEN 1, GEN 2, GEN 3 |
|---|---|---|---|---|---|---|---|
|  | 20 | 40 | 60 | 65 | 85 | 105 | 125 |
| 0 | 1.80 | 3.60 | 5.40 | 5.80 | 7.60 | 9.40 | 11.20 |
| 2.5 | 1.98 | 3.70 | 5.50 | 5.96 | 7.79 | 9.63 | 11.46 |
| 5 | 2.43 | 3.96 | 5.61 | 6.06 | 7.85 | 9.63 | 11.46 |
| 7.5 | 3.04 | 4.42 | 5.94 | 6.32 | 7.96 | 9.77 | 11.55 |
| 10 | 3.65 | 4.87 | 6.38 | 6.72 | 8.30 | 9.86 | 11.68 |
| 12.5 | 4.35 | 5.46 | 6.87 | 7.25 | 8.68 | 10.28 | 11.75 |
| 15 | 5.19 | 6.09 | 7.30 | 7.71 | 9.22 | 10.66 | 12.26 |
| 17.5 | 6.41 | 6.67 | 7.88 | 8.21 | 9.69 | 11.17 | 12.65 |
| 20 | 8.80 | 7.31 | 8.53 | 8.79 | 10.14 | 11.67 | 13.11 |
| 22.5 |  | 8.00 | 9.13 | 9.45 | 10.65 | 12.14 | 13.64 |
| 25 |  | 8.70 | 9.71 | 10.03 | 11.21 | 12.58 | 14.10 |
| 27.5 |  | 9.47 | 10.31 | 10.61 | 11.86 | 13.08 | 14.59 |
| 30 |  | 10.38 | 10.96 | 11.22 | 12.50 | 13.65 | 15.01 |
| 32.5 |  | 11.46 | 11.65 | 11.88 | 13.08 | 14.25 | 15.52 |
| 35 |  | 12.81 | 12.34 | 12.57 | 13.65 | 14.92 | 16.10 |
| 37.5 |  | 14.61 | 13.05 | 13.25 | 14.24 | 15.55 | 16.63 |
| 40 |  | 17.60 | 13.81 | 13.96 | 14.88 | 16.12 | 17.32 |
| 4.25 |  |  | 14.62 | 14.69 | 15.53 | 16.68 | 17.98 |
| 45 |  |  | 15.57 | 15.48 | 16.22 | 17.28 | 18.60 |
| 47.5 |  |  | 16.60 | 16.39 | 16.91 | 17.87 | 19.17 |
| 50 |  |  | 17.82 | 17.38 | 17.60 | 18.54 | 19.71 |
| 52.5 |  |  | 19.22 | 18.46 | 18.31 | 19.19 | 20.32 |
| 55 |  |  | 20.91 | 19.73 | 19.04 | 19.88 | 20.91 |
| 57.5 |  |  | 23.14 | 21.20 | 19.82 | 20.56 | 21.53 |
| 60 |  |  | 26.40 | 22.98 | 20.64 | 21.25 | 22.19 |
| 62.5 |  |  |  | 25.32 | 21.58 | 21.93 | 22.84 |
| 65 |  |  |  | 28.60 | 22.57 | 22.66 | 23.54 |
| 67.5 |  |  |  |  | 23.61 | 23.39 | 24.22 |
| 70 |  |  |  |  | 24.82 | 24.16 | 24.90 |
| 72.5 |  |  |  |  | 26.12 | 24.95 | 25.59 |
| 75 |  |  |  |  | 27.60 | 25.83 | 26.27 |
| 77.5 |  |  |  |  | 29.30 | 26.77 | 27.01 |
| 80 |  |  |  |  | 31.32 | 27.76 | 27.74 |
| 82.5 |  |  |  |  | 34.06 | 28.80 | 28.50 |
| 85 |  |  |  |  | 37.40 | 29.92 | 29.29 |
| 87.5 |  |  |  |  |  | 31.18 | 30.08 |
| 90 |  |  |  |  |  | 32.52 | 31.02 |
| 92.5 |  |  |  |  |  | 34.01 | 31.96 |
| 95 |  |  |  |  |  | 35.62 | 32.94 |
| 97.5 |  |  |  |  |  | 37.59 | 33.98 |
| 100 |  |  |  |  |  | 39.76 | 35.03 |
| 102.5 |  |  |  |  |  | 42.82 | 36.28 |
| 105 |  |  |  |  |  | 46.20 | 37.55 |
| 107.5 |  |  |  |  |  |  | 38.92 |
| 110 |  |  |  |  |  |  | 40.41 |
| 112.5 |  |  |  |  |  |  | 41.95 |
| 115 |  |  |  |  |  |  | 43.89 |
| 117.5 |  |  |  |  |  |  | 45.93 |
| 120 |  |  |  |  |  |  | 48.46 |
| 122.5 |  |  |  |  |  |  | 51.59 |
| 125 |  |  |  |  |  |  | 55.00 |

GENERATOR MANAGEMENT SYSTEM AND METHOD THAT SELECTIVELY ACTIVATE AT LEAST ONE OF A PLURALITY OF GENERATORS IN A POWER GENERATION SYSTEM

CLAIM OF PRIORITY

This patent application is a continuation of and claims the benefit of U.S. patent application Ser. No. 14/251,057 entitled "GENERATOR MANAGEMENT SYSTEM AND METHOD THAT SELECTIVELY ACTIVATES AT LEAST ONE OF A PLURALITY OF GENERATORS IN A POWER GENERATION SYSTEM," filed on Apr. 11, 2014, which is a continuation-in-part application and claims the benefit of priority to U.S. patent application Ser. No. 13/540,133, entitled "GENERATOR MANAGEMENT SYSTEM THAT SELECTIVELY ACTIVATES GENERATORS BASED ON AN OPERATING PARAMETER," filed on Jul. 2, 2012, each of which is hereby incorporated by reference in its entirety.

TECHNICAL FIELD

A generator management system and method, and more particularly to a generator management system and method that selectively activate at least one of a plurality of generators in a power generation system.

BACKGROUND

Electric generators are typically used to provide electrical power. One common use of electric generators is as a standby power source. Another common use of electric generators is to provide power at a remote location where utility company power is not available.

One common type of electric generator includes an internal combustion engine. The internal combustion engine drives an electrical alternator that produces alternating electricity.

Many existing systems often include multiple electric generators, especially in situations where there is a potential high demand for power. There can be advantages to employing multiple small generators rather than a single large generator.

One of the advantages is that if one generator fails, or requires maintenance, a multi-generator system can still supply some power while a single generator system would otherwise not be able to meet demand. Another advantage is that load growth may be addressed by adding another generator rather than replacing an existing generator with a larger (and more expensive) generator.

Another advantage of using multiple generators is that it is possible to stop generators that are not needed to provide power at a particular point in time. Stopping generators (i) saves wear and tear on the generators; (ii) decreases sound emissions at a location; (iii) decreases fuel consumption (and corresponding harmful environmental emissions).

Stopped generators can also be restarted as demand increases. This starting and stopping of certain generators within a plurality of generators is referred to as generator management.

Some of the drawbacks with existing generator management systems may include (i) the need for expensive external controls in order to adequately start and stop particular generators; or (ii) unequal wear of the generators resulting from the inability to dynamically change the order in which each of the plurality of generators are started and stopped in response to changes in demand.

BRIEF DESCRIPTION OF THE DRAWINGS

FIG. 5 shows an example table that identifies the best possible combination of three different generators to use for a given load.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
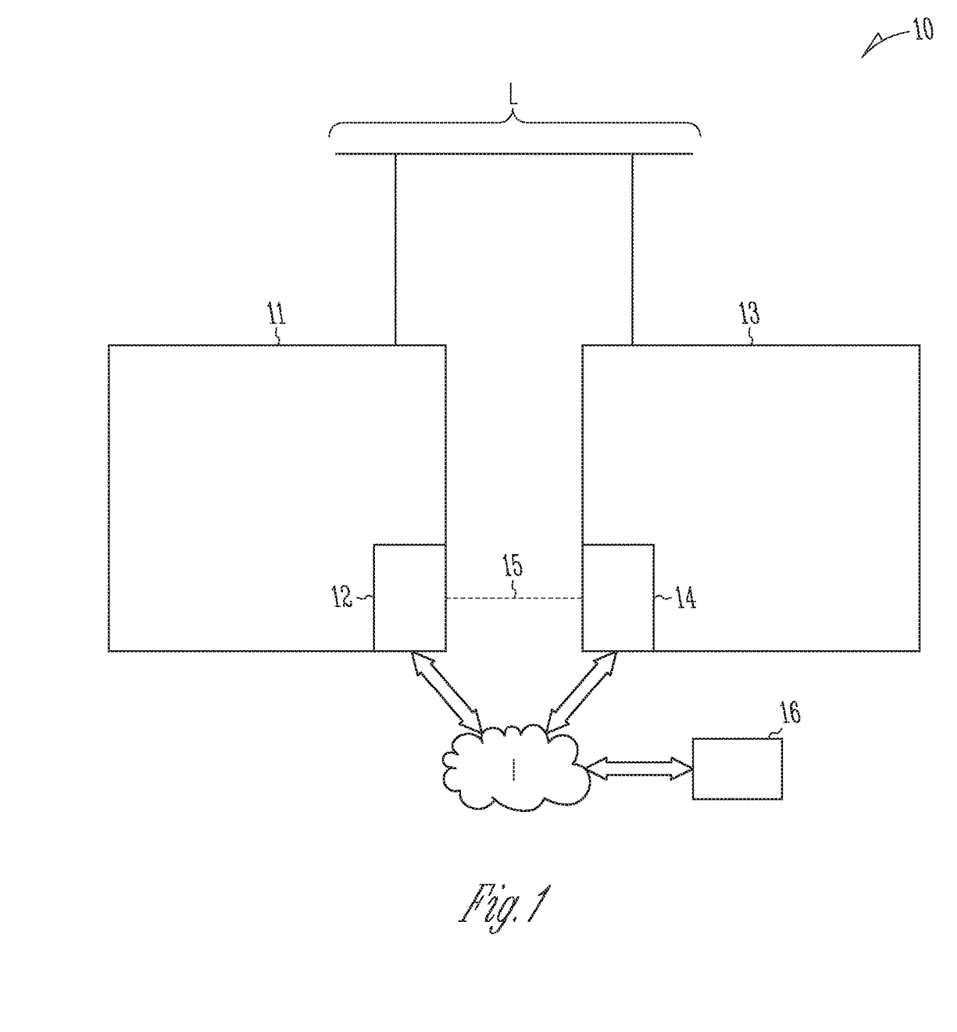
FIG. 1 is a schematic plan view of an example generator management system.

FIG. 1 is a schematic plan view of an example generator management system 10. The generator management system 10 includes a first generator 11 that is adapted to supply power to a load L and a first generator controller 12 that operates the first generator 11. The generator management system 10 further includes a second generator 13 that is adapted to supply power to the load L and a second generator controller 14 that operates the second generator 13.

The generator management system 10 further includes a communication bus 15 that connects the first generator controller 12 and the second generator controller 14 such that the first generator controller 12 and the second generator controller 14 exchange data. At least one of the first generator controller 12 and the second generator controller 14 selectively activates the first generator 11 and the second generator 13 in an order that depends on an operating parameter of the first generator 11 and the second generator 13 (as opposed to a fixed sequence or order which is done in existing systems). Therefore, the generator management system 10 is able to dynamically change the order in which each of the first and second generators 11, 13 are started and stopped in order to meet a changing demand for power at the load L.

In the example embodiment illustrated in FIG. 1, the generator management system 10 further includes a server 16 that is connected to the first and second generator controllers 12, 14 via a network (e.g. the Internet I). It should be noted that in embodiments that include server 16, at least one of the first generator controller 12, the second generator controller 14 and the server 16 may selectively activate the first generator 11 and the second generator 13 in an order that depends on an operating parameter of the first generator 11 and the second generator 13.

In some embodiments, the order in which the first generator 11 and the second generator 13 are selectively activated depends on a total number of run hours that is associated with each of the first and second generators 11, 13. As an example, the order may be established such that the one of the first generator and the second generator 11, 13 with the lower number of total run hours is selected to activate first.

Embodiments are also contemplated where the order depends on a total amount of emissions that are generated by each of the first and second generators 11, 13. As an example, the order is established such that the one of the first generator 11 and the second generator 13 which generates fewer emissions is selected to activate first.

It should be noted that various different types of emissions may be used to establish the order for selectively activating the first generator 11 and the second generator 13. Example emissions include hydrocarbon emissions and sound emissions (among others).

In some embodiments, the order in which the first generator 11 and the second generator 13 are selectively activated depends on a cost that is associated with operating each of the first and second generators 11, 13. As an example, the cost may be determined by a rate of fuel consumption of each of the first and second generators 11, 13. As another example, the cost may be determined by maintenance costs that are associated with operating each of the first and second generators 11, 13.

Embodiments are also contemplated where the order depends on a pre-fault condition that exists for each of the first and second generators 11, 13. One example pre-fault condition may be low fuel level. As an example, when one of the first and second generators 11, 13 has a low fuel level, the other of the first and second generators 11, 13 may be selectively activated first.

In embodiments where the first and second generators 11, 13 each supply the load through circuit breakers, an example pre-fault condition may be that one of the circuit breakers is unable to open. In this example, the generator that is connected to the load through the circuit breaker that is unable to open is selectively activated first.

In embodiments where the first and second generators 11, 13 each include an engine, the pre-fault condition may relate to an operating parameter of the respective engine. Some examples of pre-fault condition that relates to engines include; high coolant temperature warning, low oil pressure warning, sensor malfunction and low battery voltage warning.

Embodiments are also contemplated where the order depends on the age of the fuel with each respective engine. As an example, when one of the first and second generators 11, 13 has an older fuel supply, that generator 11, 13 that includes the older fuel supply may be selectively activated first to consume the older fuel.

In some embodiments, the order in which the first generator 11 and the second generator 13 are selectively activated depends on a minimum load requirement for each of the first and second generators 11, 13. As an example, the minimum load requirement may be set by local emissions standards.

Embodiments are contemplated where a secondary operating parameter is designated for selectively activating one of the first and second generators when the primary operating parameter is effectively equal.

As an example, during operation of the generator management system 10, the first and second generators 11, 13 will tend to equalize their primary operating parameter (e.g., fuel levels within the first and second generators 11, 13 will tend to equalize when the fuel level is the primary operating parameter). In addition, external activity may tend to equalize the primary operating parameter (e.g., when a fuel equalizing tube is placed between the first and second generators 11, 13).

It should be noted although only first and second generators 11, 13 are described herein, the generator management system 10 may include any additional number of generators. The generator management system 10 would be able to selectively activate some (or all) of the additional generators in an order that depends on an operating parameter of the generators.

The generator management systems 10 described herein may serve to equalize some primary (and possibly secondary) operating parameter of the generators that are part of the generator management system 10. In addition, the generator management systems 10 described may be able to dynamically change the order in which each of the generators within the generator management systems 10 are started and stopped to meet changing load demands (without the need for expensive external controls).

Figure 2:
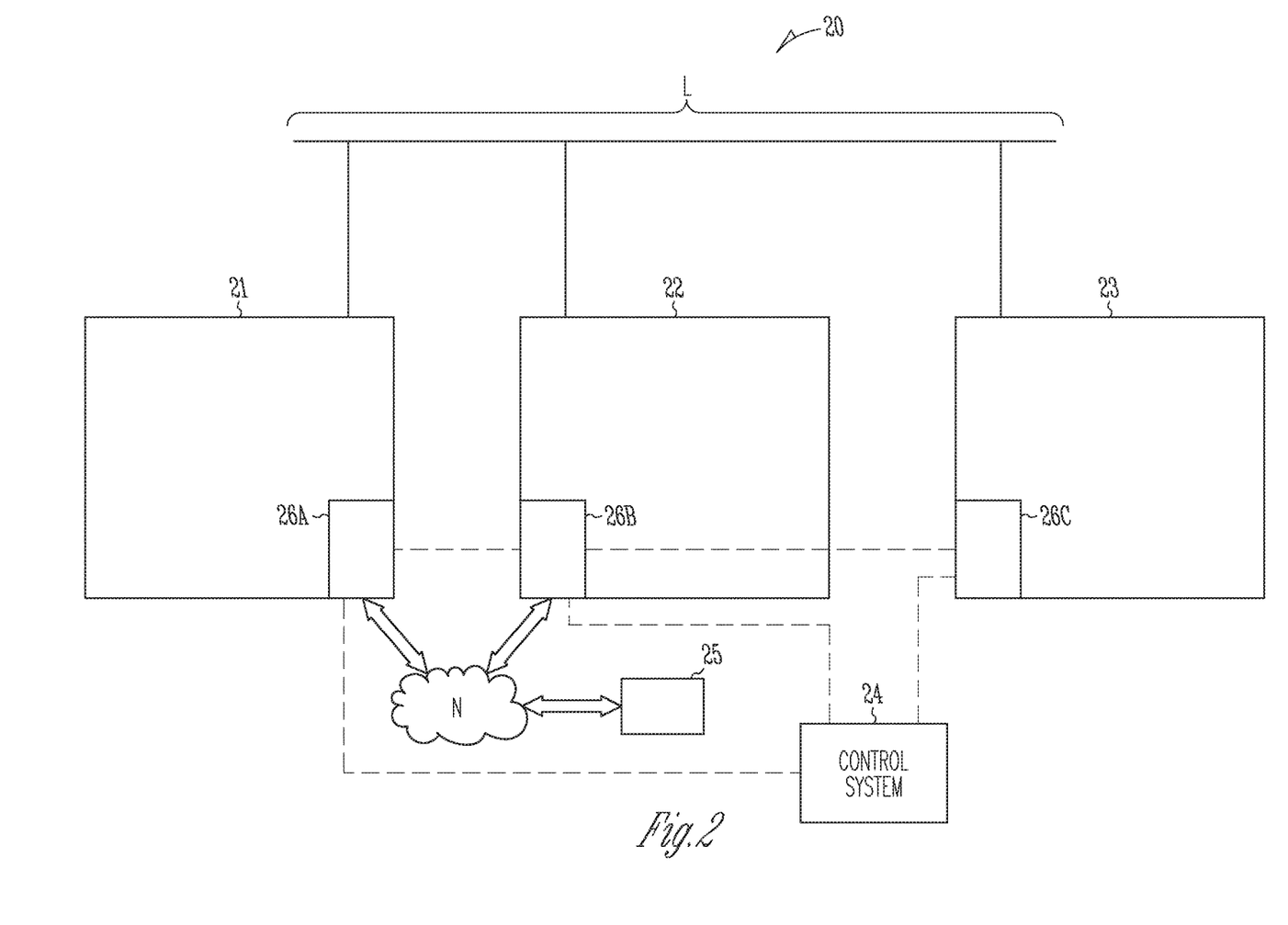
FIG. 2 is a schematic plan view of a power generation system.

FIG. 2 is a schematic plan view of an example power generation system 20. The power generation system 20 may include a plurality of generators 21, 22, 23 that may be adapted to supply power, individually or in combination, to a load L. While three generators 21, 22, 23 are shown, the power generation system 20 may include fewer or more generators. Additionally, although the load L is shown as a single load L, the load L may be a combination of loads that are individually, partially or collectively supplied with power by the power generation system 20.

The generators 21, 22, 23 may all be the same or similar (such as having the same or similar size, fuel type, or emission efficiency), or any or all of the generators 21, 22, 23 may be different from the other generators 21, 22, 23 (such as having a different size, fuel type, fuel ignition type, or emission efficiency). For example, in some systems, the generators 21, 22, 23 may all be spark-ignited engine-generator sets (also referred to as a "spark-ignited generator" or "spark-ignited genset") such as gasoline-powered engine-generator sets, but may each be sized differently. In other systems, one or more of the generators 21, 22, 23 may be a compression-ignited engine-generator set (also referred to as a "compression-ignited generator" or "compression-ignited genset") such as diesel-powered engine-generator sets, while other generators 23 may be spark-ignited generators. In still other systems, one or more of the generators 21, 22, 23 may be a variable speed generator. Many other variations are possible.

The power generation system 20 may further include a control system 24. In some examples of the power generation system 20, the control system 24 may include one or more generator controllers 26A, 26B, 26C that control operation of at least one of a plurality of generators 21, 22, 23. As examples, the control system 24 may include one generator controller that controls all of the generators 21, 22, 23, or as shown in FIG. 2, the control system 24 may include multiple generator controllers 26A, 26B, 26C such that each generator controller 26A, 26B, 26C controls a respective one of the generators 21, 22, 23. As still another example, the control system 24 may include multiple generator controllers 26A, 26B, 26C, with one or more generator controllers controlling one generator, and one or more generator controllers controlling more than one generator.

In example power generation systems where the control system 24 includes multiple generator controllers 26A, 26B, 26C, the generator controllers 26A, 26B, 26C may be able to communicate with one another and/or other parts of the control system 24, such as over, through, or otherwise using one or more wired or wireless networks N.

The power generation system 20 may additionally or alternatively include one or more servers 25. The server 25 may be connected to and/or communicate with the control system 24 and/or any of the generator controllers 26A, 26B, 26C via the wired or wireless network N.

The control system 24 (with or without the server 25) may monitor one or more parameters of the power generation system 20. The control system 24 may additionally or alternatively control and/or operate one or more of the plurality of generators 21, 22, 23. The control system 24 may selectively activate or deactivate some (or all) of the generators 21, 22, 23 in an order that depends on a system parameter.

The control system 24 may, for example, monitor a load to be powered by the power generation system 20, determine which of the plurality of generators 21, 22, 23 to activate or deactivate based on a system parameter in order to optimize an operating variable (such as a consumable input like fuel or an undesired output such as noise or pollutants) of the power generation system 20, and may control the generators 21, 22, 23 based on the determination. As some specific examples, the control system 24 may determine which of the plurality of generators 21, 22, 23 to activate or deactivate based on a system parameter in order to minimize fuel consumption, to maximize efficiency (such as fuel efficiency), to minimize sound or noise emissions, to maximize run time or maintenance intervals, or to minimize pollutant or various harmful emissions (for example, carbon dioxide, hydrocarbons, carbon monoxide, oxides of nitrogen). Other variations are possible.

Figure 3:
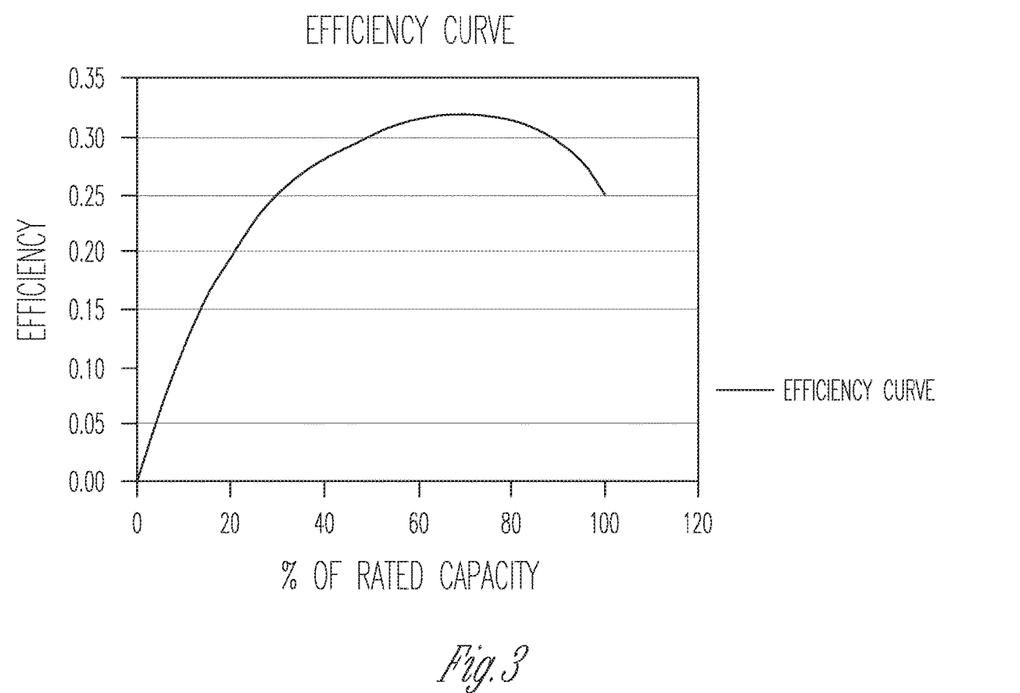
FIG. 3 shows an example efficiency curve for a spark ignited generator.

FIG. 3 shows an example efficiency curve for a spark ignited generator. Spark ignited generators may typically operate most efficiently at a particular load or range of loads. In the example illustrated in FIG. 3, the load at which the spark-ignited generator operates most efficiently at is between 60% and 80% of generator rated capacity. Efficiency may be defined as the ratio between the mechanical power produced and rate of chemical energy consumption. Efficiency may be calculated based on the rated (i.e., listed) brake specific fuel consumption of the engine at a given operating speed (e.g., 1800 rpm or other speeds). Other variations are possible.

Figure 4A:
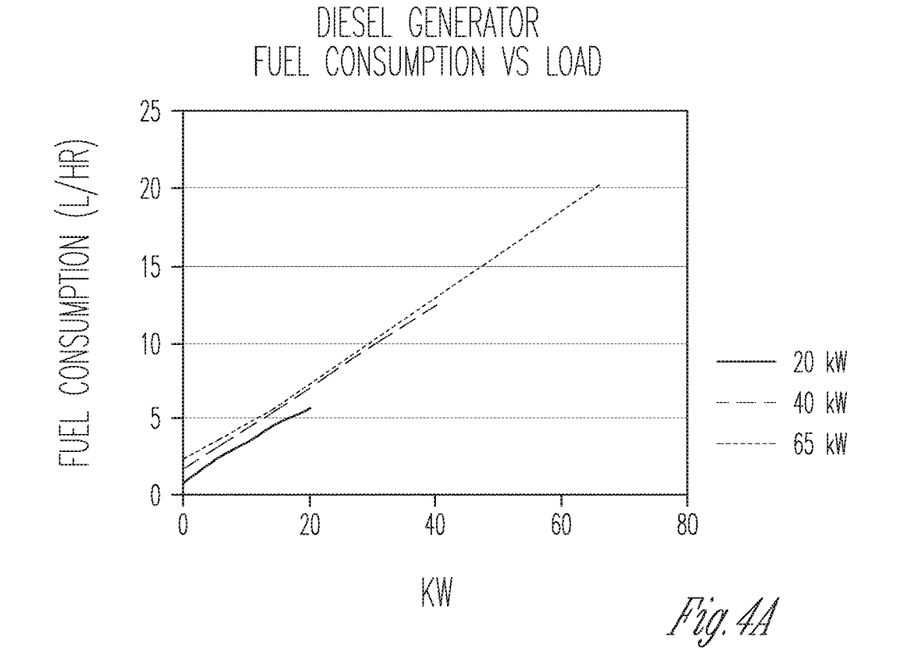
FIGS. 4A and 4B provide example efficiency curves of different sized generators.
Figure 4B:
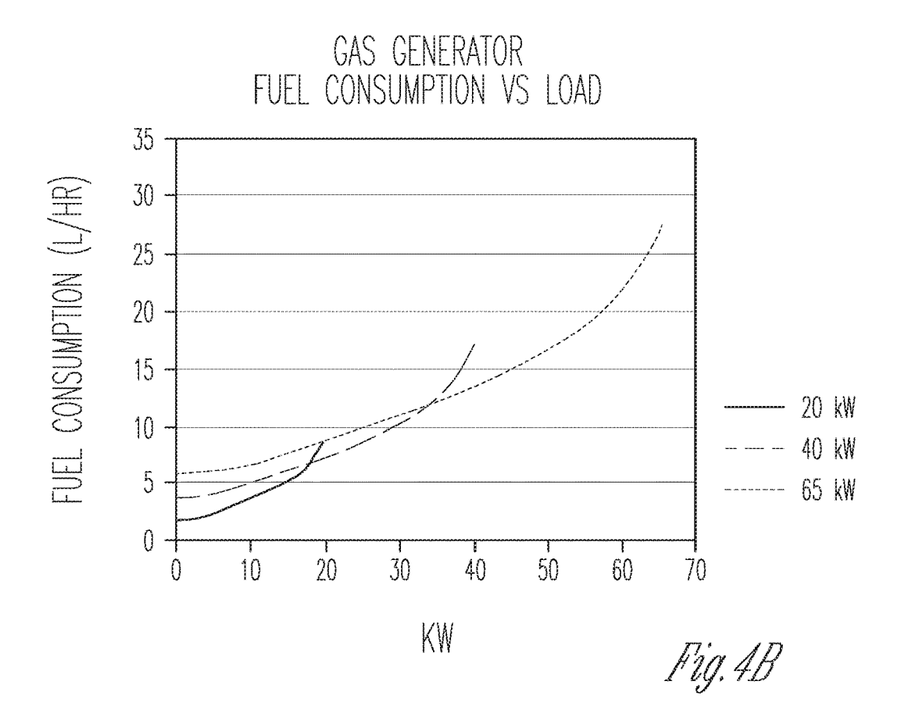

FIGS. 4A and 4B provide example efficiency curves of different sized generators (e.g., 20 kW, 40 kW and 65 kW). For example, FIG. 4A shows example efficiency curves for three different sized compression-ignited generators. FIG. 4B shows example efficiency curves for three different sized spark-ignited generators.

FIGS. 4A and 4B illustrate that different sized generators may have different efficiencies at different load levels. For example, in FIG. 4B at a 10 kW load, (i) the 20 KW generator would use about 3.5 L/hr. of fuel; (ii) the 40 KW generator would use about 5 L/hr. of fuel; and (iii) the 65 kW generator would use about 6.3 L/hr. of fuel. Therefore, based on a 10 kW load, the 20 kW generator would be an optimum choice to supply power to the 10 kW load in order to minimize fuel consumption.

While FIGS. 4A-4B relate to fuel consumption, similar determinations may be made to optimize other operating variables or combination of variables, such as sound or pollutant emissions or maintenance intervals. In some systems, the power generation system 20 may optimize one or more operating variables within various rules, constraints, or other operating variable requirements. For example, the power generation system 20 may optimize one or more operating variables which ensure that a minimum load is maintained on at least one of the plurality of generators 21, 22, 23. As another example, the power generation system 20 may optimize one or more operating variables based on an anticipated load L of the system. Other variations are possible.

The control system 24 may determine a combination of generators 21, 22, 23 that optimize an operating variable in various ways. For example, in some systems, the control system 24 in the power generation system 20 may calculate the operating variable for each possible permutation of active generators in the plurality of generators 21, 22, 23 based on a parameter of the power generation system 20. As a specific example, the control system 24 may determine a load L, and may calculate a fuel efficiency (or other operating variable) that would result from using each permutation of generators 21, 22, 23 in the system at that determined load L. In some example forms of the power generation system 20, the control system 24 may actually measure the fuel consumption of each possible permutation of active generators in the plurality of generators 21, 22, 23. In other examples, the power generation system 20 may refer to established tables, calculations, or estimations to identify the fuel efficiency at the determined load L. After determining the operating variable (such as fuel efficiency) for each permutation of generators 21, 22, 23, the control system 24 may identify the permutation that results in the optimal operating variable (such as the greatest fuel efficiency or lowest fuel consumption), and may control the generators 21, 22, 23 in this permutation to operate accordingly.

The control system 24 may perform the calculations for the operating variable in a given order. As one example, the control system 24 may begin calculating the operating variable for the permutation with the smallest possible total load of active generators, and performing the calculation for permutations with increasing total load of the active generators. As another example, the control system 24 may perform the calculation in a reverse order, starting with the largest load capacity first, and then progressively performing the calculation for permutations with smaller total load capacity. In still other examples, the control system 24 may perform the calculation for all permutations with only one active generator first, then all permutations with two generators next, and so on (or vice versa). Many other variations are possible.

In some examples, the control system 24 may not perform a calculation for all permutations. For example, the control system 24 may perform the calculations in an order (such as starting with permutations with the smallest load capacity and progressively increasing the load capacity of the permutations). The control system 24 may calculate the operating variable for the first two permutations of the order (such as the smallest and second smallest load capacities), and may compare the two calculated operating variables. Where the latest calculated operating variable is more optimized than (or equal to) the older calculated operating variable ($SV_n$>or =$SV_{n-1}$), the control system 24 may calculate the operating variable for the third permutation of active generators, and compare this third calculated operating variable to the second calculated operating variable. This process may continue until the most recent calculated operating variable is not more optimized than the previous calculated operating variable ($SV_n < SV_{n-1}$). At this point, the control system 24 may determine that the previous (n−1) permutation produced the optimal operating variable, and may control the generators 21, 22, 23 in accordance with the previous (n−1) permutation. Other variations are possible.

In another example, the control system 24 may determine a set of generators 21, 22, 23 to operate to optimize an operating variable by using historical data or tables. FIG. 5 shows an example table that identifies possible combinations of generators GEN 1-3 (which may be similar to or the same as generators 21, 22, 23) to use for a given load. In some example systems, the generators GEN 1-3 may each be different sized generators. For example, GEN 1 may be a 20 kW spark-ignited generator, GEN 2 may be a 40 kW spark-ignited generator, and GEN 3 may be a 65 kW spark-ignited generator.

Figure 6:
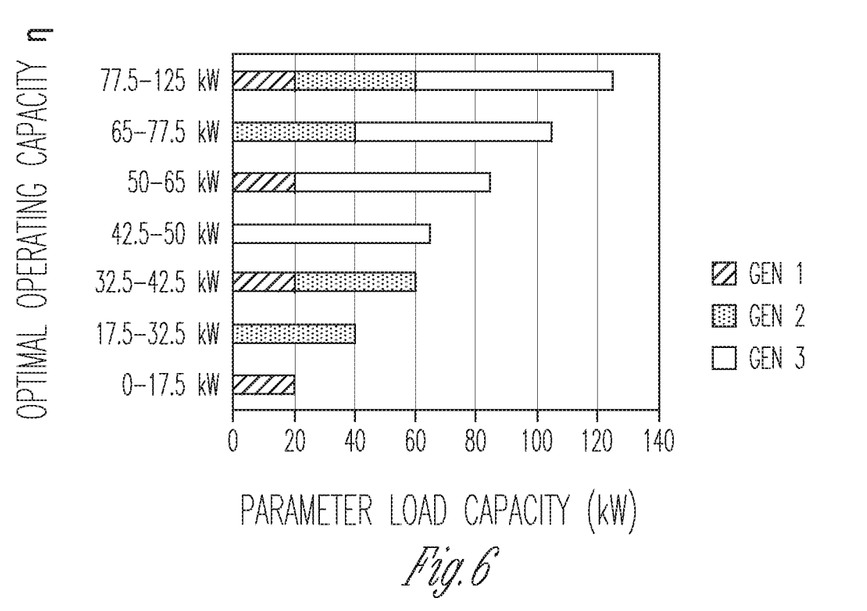
FIG. 6 is a bar graph that presents the information in the table shown in FIG. 5 in another form.

FIG. 6 is a bar graph that illustrates the optimum permutation of generators GEN 1-3 to use at various load capacities. The bars of the bar graph in FIG. 6 illustrate a maximum operating capacity of each permutation of generators GEN 1-3 versus Generator Load (kW capacity) for a variety of operating ranges. The labels on the Y-axis illustrate the optimum load ranges at which to operate for of each permutation of generators GEN 1-3.

The control system 24 may use the data in the example table to identify a combination of the different generators GEN 1-3 which may provide an optimal operation of the power generator system 20 at a given load. For example, the table or similar data may be stored in the server 25 or another memory. The control system 24 may identify a load to be powered by the power generation system 20, and may consult the stored table or similar data to determine the combination of generators GEN 1-3 which may optimize the operating variable.

The values shown in the table of FIG. 5 are merely examples, and may be different when any, or all, of the generators 21, 22, 23 are a different size, fueled by a different fuel source, or otherwise constructed or manufactured in different ways.

The following Examples are provided for illustration purposes only, and illustrate how a control system 24 may determine a set of generators to control to optimize an operating variable such as fuel efficiency:

EXAMPLE #1

The power generation system 20 is supplying power to a 40 kW load. Based on the data in the table shown in FIG. 5, the control system 24 would selectively activate or deactivate generators until the first 20 kW generator 21 and the second 40 kW generator 22 were supplying power to the load L.

EXAMPLE #2

The power generation system 20 is supplying power to a 50 kW load. Based on the data in the table shown in FIG. 5, the control system 24 would selectively activate or deactivate generators until only the third 65 kW generator 23 were supplying power to the load L.

EXAMPLE #3

The power generation system 20 is supplying power to a 60 kW load. Based on the data in the table shown in FIG. 5, the control system 24 would selectively activate or deactivate generators until the first 20 kW generator 21 and the second 40 kW generator 22 were supplying power to the load L.

EXAMPLE #4

The power generation system 20 is supplying power to a 75 kW load. Based on the data in the table shown in FIG. 5, the control system 24 would selectively activate or deactivate generators until the second 40 kW generator 21 and the third 65 kW generator 22 were supplying power to the load L.

EXAMPLE #5

The power generation system 20 is supplying power to a 100 kW load. Based on the data in the table shown in FIG. 5, the control system 24 would selectively activate all of generators until the first 20 kW generator 21, the second 40 kW generator 22 and the third 65 kW generator 23 were supplying power to the load L.

In some forms of the power generation system 20 the tables and/or data relating to fuel efficiency or some other parameter may be updated based on periodic or continuous measurements of the fuel efficiency of the individual and/or collective set of generators 21, 22, 23. The control system 24 may generate data tables that may be used to optimize an operating variable based on external sensors, user input and communicated or measured system operating parameters. The control system 24 may also regularly or frequently update any tables and/or curves during operation of the power generation system 20.

The power generation system 20 may additionally or alternatively use operating variable curves, such as the curves of FIGS. 4A and 4B, to determine which generators to operate to optimize the operating variable. For example, as discussed above, the control system 24 may identify a load L to be powered by the power generator system 20, and may identify the generators 21, 22, 23 which provide an optimum choice to minimize fuel consumption (or optimize a different operating variable). As a specific example, based on a 10 kW load, the control system 24 may consult the efficiency curves and/or related data identify the 20 kW generator as an optimum choice to supply power to the 10 kW load in order to minimize fuel consumption.

The power generation system 20 may additionally or alternatively determine a combination of generators 21, 22, 23 that optimize an operating variable by performing one or more calculations or algorithms. For example, the control system 24 may perform one or more calculations which may estimate fuel consumption for a system at a given load, or may identify an appropriate set of generators to operate based on a given load.

In some forms of the power generation system 20, the control system 24 may selectively activate the smallest number of generators possible to meet the actual (or expected) load L. The control system 24 may then selectively activate additional generators so that the appropriate combination of generators is operating based on particular primary and secondary system parameters within the power generation system 20.

The control system 24 in the power generation system 20 may be able monitor utility power that is also capable of supplying power to the load L. The control system 24 may be able to identify only the appropriate number of generators 21, 22, 23 that are needed to meet a pre-existing load during a smooth or expected utility-to-backup power transition.

Typically, when paralleled generators are needed in conventional power generation systems, all of the generators are started because the generator controllers don't know the load L until a generator connects to the load L by means of a paralleling breaker connected to the generators. After closing the paralleling breaker, the controllers determine the magnitude of the load L allowing a determination of the number of generators that are needed to supply the load L.

The power generation systems 20 described herein may monitor the utility power draw so that the control system 24 knows what the power draw is before switching to generator power. One other example application where such power draw knowledge may be utilized is when you're on a boat and transferring from shore power to secondary power.

The control system 24 in power generation systems 20 that include some form of load control system (not shown) may be able to vary load shed timing based on a state of the power generator system 20. As an example, the state of the power generator system 20 may be based on the number of generators 21, 22, 23 that are running. As another example, the state of the power generator system 20 may be based on the number of generators 21, 22, 23 that are able to run.

Typically, in conventional power generation systems, a controller may be set up to coordinate the timing between starting a generator and shedding a load. As an example, this typical timing may be approximately 15 seconds. However, if all generators are online, there is little benefit from waiting 15 seconds before shedding a load, because there are no additional generators that can be added to handle the load.

The example power generation systems 20 described herein may limit the load shed timing to a much lower value (e.g., 3 seconds). The example power generation systems 20 described herein may also base load shed timing on a condition of the power generation system 20. As an example, the load shed timing may be a first timing (e.g., 15 seconds) when at least one generator is offline and a second timing (e.g., 3 seconds) when all generators 21, 22, 23 are online.

Figure 7:
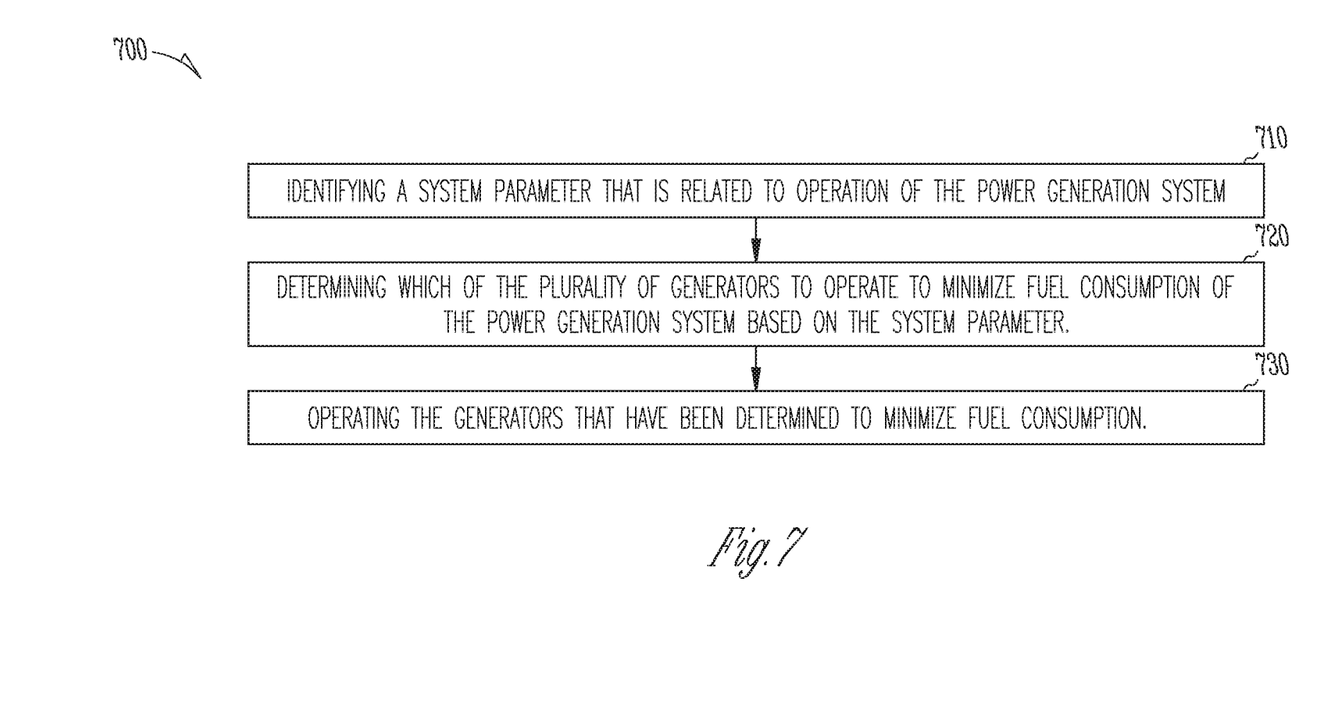
FIG. 7 illustrates a flow diagram of an example method of determining an operation of at least one of a plurality of generators in a power generation system.

FIG. 7 illustrates a flow diagram of an example method [700] of determining an operation of at least one of a plurality of generators in a power generation system. The method may be performed by the control system 24 or various other components of the power generation system 20. The method may be implemented in software and/or stored in memory. The method may be implemented as logic which the control system 24 or another component of the power generation system 20 may execute. The method includes [710] identifying a system parameter that is related to operation of the power generation system, and [720] determining which of the plurality of generators to operate to minimize fuel consumption of the power generation system based on the system parameter. In some forms of the method [700] the method [700] further includes [730] operating the generators that have been determined to minimize fuel consumption.

As an example, [710] identifying a system parameter that is related to operation of the power generation system may include identifying an existing load that is supplied with power from the power generation system.

As another example, [710] identifying a system parameter that is related to operation of the power generation system may include identifying an anticipated load that is to be supplied with power from the power generation system.

As another example, [710] identifying a system parameter that is related to operation of the power generation system may include identifying a minimum load that must be maintained to operate the power generation system.

[720] Determining which of the plurality of generators to activate or deactivate to minimize fuel consumption of the power generation system based on the system parameter may include calculating expected fuel consumption for each possible permutation of active generators in the plurality of generators based on the system parameter.

As an example, calculating expected fuel consumption for each possible permutation of active generators in the plurality of generators based on the system parameter may include calculating fuel consumption for each generator in the plurality of generators.

As another example, calculating fuel consumption for each possible permutation of active generators in the plurality of generators may include obtaining data from fuel efficiency curves that indicate fuel consumption for each possible permutation of active generators in the plurality of generators.

As another example, calculating fuel consumption for each possible permutation of active generators in the plurality of generators may include obtaining data from brake specific fuel consumption curves for each generator based on a predicted load on each generator.

As another example, calculating fuel consumption for each possible permutation of active generators in the plurality of generators may include measuring fuel consumption for each generator in the plurality of generators. In some example forms of the method [700], measuring fuel consumption for each generator in the plurality of generators may include storing fuel consumption data and utilizing the fuel consumption data in determining which of the plurality of generators to activate or deactivate in order to minimize fuel consumption of the power generation system.

Forms of the method [700] are contemplated where at least one generator in the plurality of generators is different in size, fuel efficiency or fuel type than the other generators in the plurality of generators. Other combinations are also contemplated where more than one generator in the plurality of generators is different in size, fuel efficiency or fuel type than the other generators in the plurality of generators.

Figure 8:
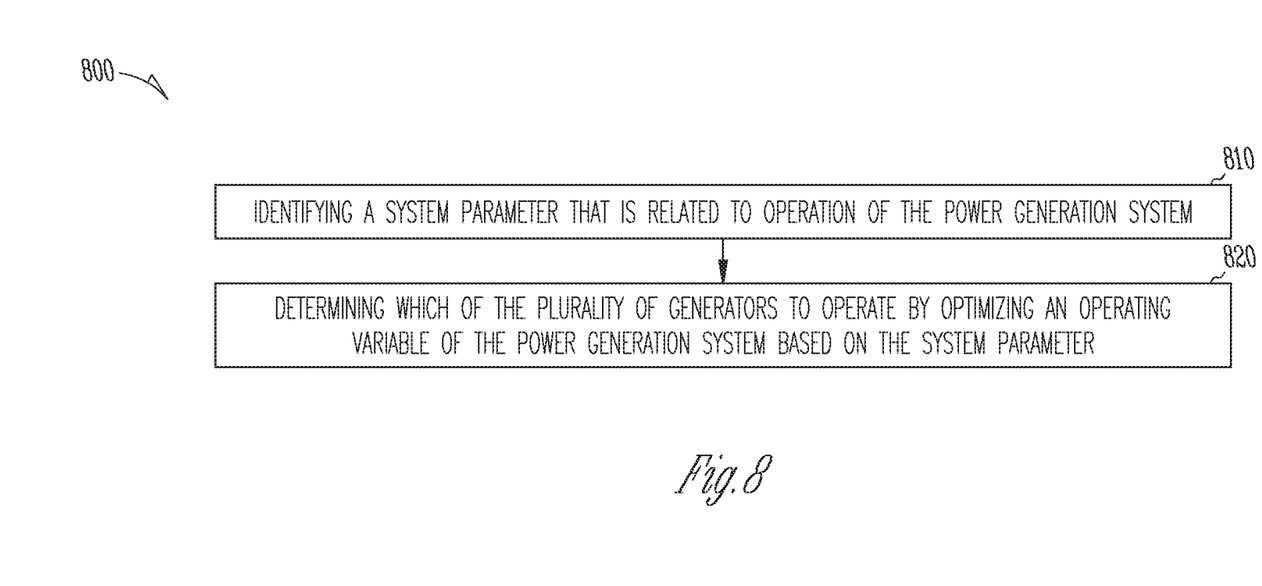
FIG. 8 illustrates a flow diagram of another example method of determining an operation of at least one of a plurality of generators in a power generation system.

FIG. 8 illustrates a flow diagram of an example method [800] of determining an operation of at least one of a plurality of generators in a power generation system. The method may be performed by the control system 24 or various other components of the power generation system 20. The method may be implemented in software and/or stored in memory. The method may be implemented as logic which the control system 24 or another component of the power generation system 20 may execute. The method includes [810] identifying a system parameter that is related to operation of the power generation system, and [820] determining which of the plurality of generators to operate by optimizing an operating variable of the power generation system based on the system parameter.

[820] Optimizing an operating variable of the power generation system based on the system parameter may include minimizing fuel consumption of the power generation system. As an example, minimizing fuel consumption of the power generation system may include calculating fuel consumption for each generator in the plurality of generators to determine which permutation of generators to operate to minimize fuel consumption.

[820] Optimizing an operating variable of the power generation system based on the system parameter may also include minimizing emissions of the power generation system. As an example, minimizing emissions of the power generation system may include minimizing sound emissions and/or environmental emissions (e.g., carbon dioxide, hydrocarbons, carbon monoxide and oxides of nitrogen).

In some forms of the method [800], optimizing an operating variable of the power generation system based on the system parameter may include maximizing operating life of the power generation system. As an example, even though it may be more efficient to operate one or more generators at 100% rated capacity for extended periods of time, operating the generators in such a manner may have the effect of reducing the operating life of the generator(s).

Forms of the method [800] are contemplated where a combination of some of the aforementioned operating variables (e.g., emissions, fuel consumption and/or generator operating life) are combined to determine which of the plurality of generators to operate.

Figure 9:
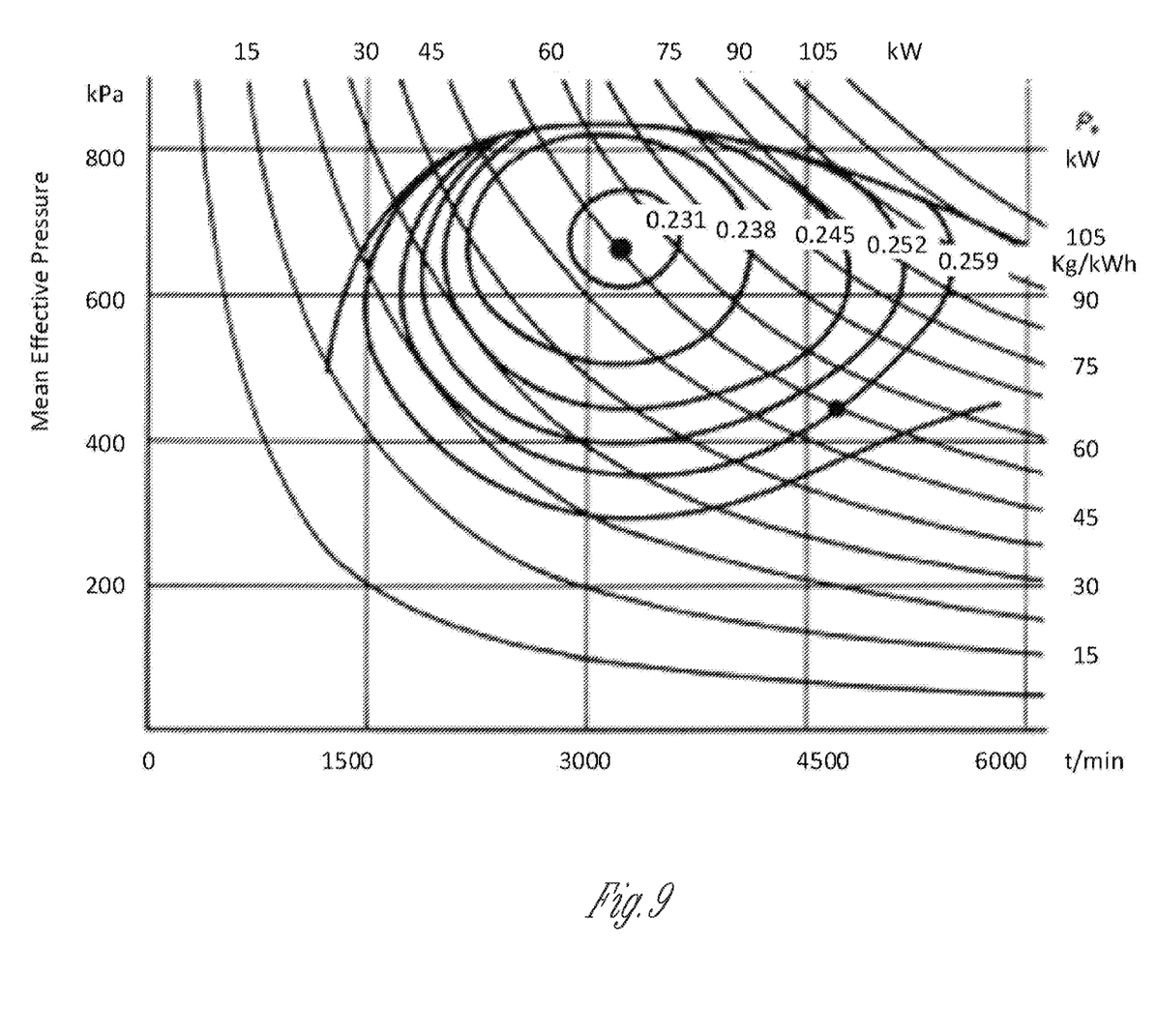
FIG. 9 illustrates a brake specific fuel consumption curve for an example engine.

FIG. 9 illustrates an example three dimensional brake specific fuel consumption curve for an engine. The horizontal axis indicates engine speed, the vertical axis indicates engine load and the topographical axis (z-axis) indicates brake specific fuel consumption.

Figure 10:
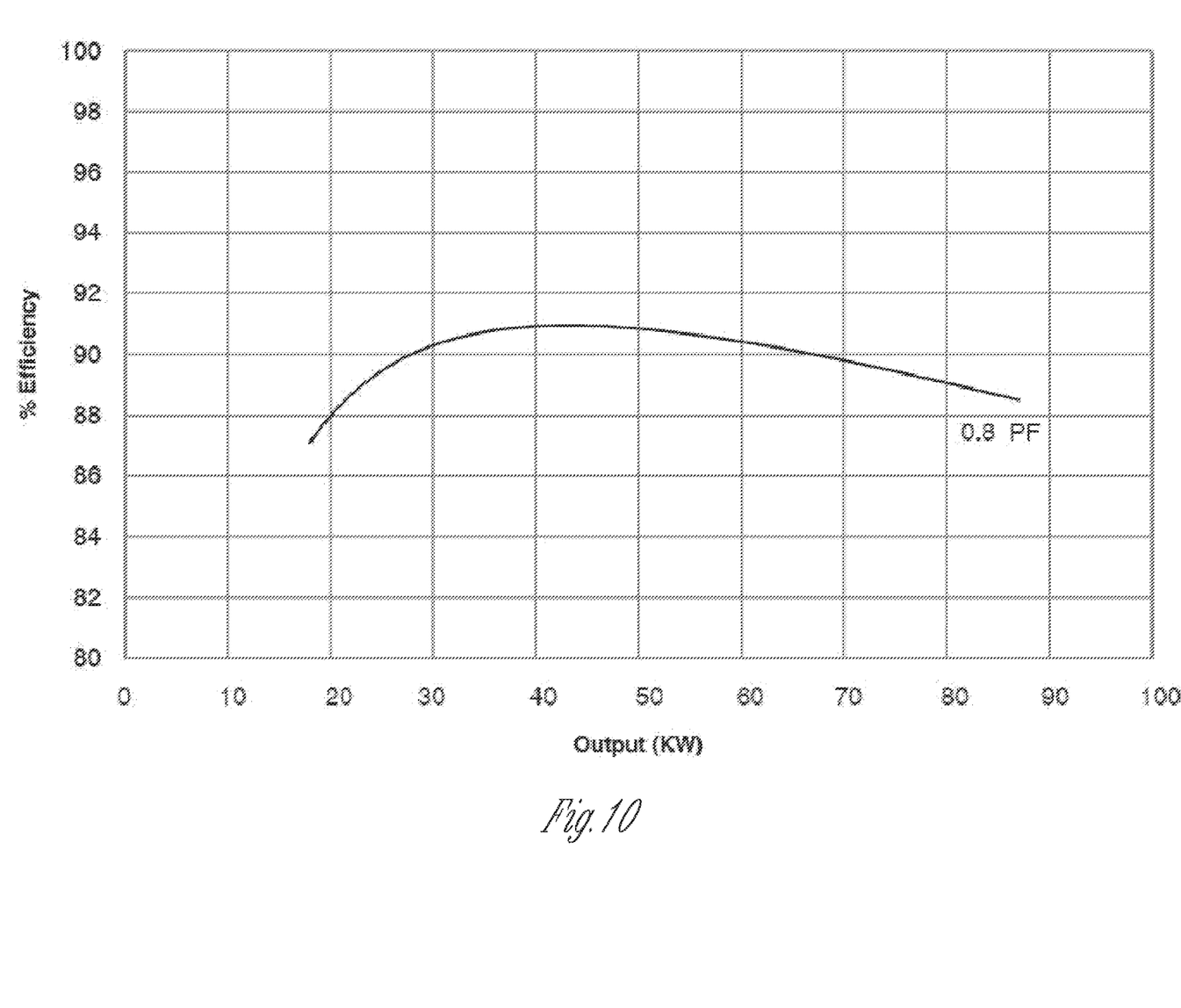
FIG. 10 illustrates a total efficiency curve for an example alternator.

FIG. 10 illustrates a total efficiency curve for an example alternator. The horizontal axis indicates output electrical power and the vertical axis indicates efficiency. An example procedure for determining a fuel consumption curve of an example generator using the engine of FIG. 9 and the alternator of FIG. 10 involves establishing fuel consumption at various generator load points and includes (i) obtaining alternator efficiency from FIG. 10 at each load; (ii) dividing the load by the alternator efficiency to determine the load on the engine; (iii) obtaining an engine brake specific fuel consumption from FIG. 9 based on the load on the engine and the engine speed at that particular load; (iv) multiplying the brake specific fuel consumption by the load on the engine to determine a fuel consumption rate; and (v) determining a fuel consumption curve of an example generator by repeating steps (i)-(iv) for the range of possible generator loads.

Neither alternator efficiency nor brake specific fuel consumption is listed at 0% load due to efficiency being meaningless with no output. Fuel consumption data may be obtained at 0% load to allow the fuel consumption curve of an example generator to be completed. Other relatively small loads may be obtained in a similar way.

The procedures described above may be used to determine fuel consumption curve of an example generator for various types of generators. Example generators include constant-speed fixed pole (unchanging alternator pole count), constant-speed variable pole (multiple alternator pole configurations) and variable speed generators. Other procedure variations and generator types are possible.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A method of operating a plurality of generators to provide power to a load, the method comprising:
    comparing a primary operating parameter of each of the plurality of generators, the primary operating parameter being modifiable through generator operation;
    determining a first order to operate the plurality of generators based on the comparison of the primary operating parameters;
    operating the plurality of generators according to the first order until the primary operating parameter of the plurality of generators is equalized;
    comparing a secondary operating parameter of each of the plurality of generators when the primary operating parameter of the plurality of generators is equalized; and
    determining a second order to operate the plurality of generators based on the comparison of the secondary operating parameters.

2. The method of claim 1, wherein the primary operating parameter is generator run time.

3. The method of claim 2, wherein determining a first order to operate the plurality of generators comprises ordering a generator with the lowest number of total run hours first.

4. The method of claim 1, wherein the primary operating parameter is fuel level.

5. The method of claim 4, wherein determining a first order to operate the plurality of generators comprises ordering a generator with the highest fuel level first.

6. The method of claim 1, wherein the secondary operating parameter is noise emissions.

7. The method of claim 1, wherein the secondary operating parameter is pollutant emissions.

8. The method of claim 1, further comprising dynamically changing the first order or the second order in response to a change in the load.

9. A method of operating a plurality of generators, the method comprising:
    comparing a primary operating parameter of each of the plurality of generators;
    determining a first order to operate the plurality of generators based on the comparison of the primary operating parameters when the primary operating parameter of each of the plurality of generators are not equal;
    operating the plurality of generators according to the first order until the primary operating parameter of the plurality of generators is equalized;
    comparing a secondary operating parameter of each of the plurality of generators when the primary operating parameter of each of the plurality of generators are equal; and
    determining a second order to operate the plurality of generators based on the comparison of the secondary operating parameters when the primary operating parameter of each of the plurality of generators are equal.

10. The method of claim 9, wherein one of the primary operating parameter and the secondary operating parameter is generator run time.

11. The method of claim 10, wherein determining the first order to operate the plurality of generators based on the comparison of the primary operating parameters comprises ordering a generator with the lowest number of total run hours first.

12. The method of claim 9, wherein one of the primary operating parameter and the secondary operating parameter is fuel level.

13. The method of claim 12, wherein determining the first order to operate the plurality of generators based on the comparison of the primary operating parameters comprises ordering a generator with the highest fuel level first.

14. The method of claim 9, wherein one of the primary operating parameter and the secondary operating parameter is maintenance cost.

15. The method of claim 9, wherein one of the primary operating parameter and the secondary operating parameter is pollutant emissions.

16. A system, comprising:
- a plurality of generators that are adapted to supply power to a load; and
- a control system that operates the plurality of generators, wherein the control system is configured to compare a primary operating parameter of each of the plurality of generators, operate a first subset of the plurality of generators according to a first order until the primary operating parameter of each of the plurality of generators is equalized, and operates a second subset of the plurality of generators based on a comparison of secondary operating parameters when the primary operating parameter of each of the plurality of generators are equal.

17. The system of claim 16, wherein the control system selectively activates the smallest number of generators possible to power the load.

18. The system of claim 16, wherein one of the primary system parameter and the secondary operating parameters includes generator load capacity.

19. The system of claim 16, wherein one of the primary system parameter and the secondary operating parameters includes generator run time or fuel level.

20. The system of claim 16, wherein one of the primary system parameter and the secondary operating parameters includes noise emissions or pollutant emissions.

* * * * *